United States Patent

Suntop et al.

[15] 3,649,778

[45] Mar. 14, 1972

[54] SELECTIVE RINGING IN SUBSCRIBER CARRIER TELEPHONE SYSTEM

[72] Inventors: Morris A. Suntop; Uno Randmere, both of Rochester, N.Y.

[73] Assignee: Stromberg-Carlson Corporation, Rochester, N.Y.

[22] Filed: Sept. 18, 1970

[21] Appl. No.: 73,560

[52] U.S. Cl. .....179/17 E

[51] Int. Cl. .....H04j 1/14

[58] Field of Search .....179/2.5, 8.5, 15 BY, 17 A, 179/17 E, 18 FH

[56] References Cited

UNITED STATES PATENTS

| | | | |
|---|---|---|---|
| 2,932,694 | 4/1960 | Hawks | 179/2.5 R |
| 2,820,848 | 1/1958 | Horwitz | 179/8.5 |
| 2,782,259 | 2/1957 | Dimond | 179/8.5 |
| 2,824,173 | 2/1958 | Meagham | 179/8.5 |

*Primary Examiner*—Kathleen H. Claffy
*Assistant Examiner*—David L. Stewart
*Attorney*—Hoffman Stone and Charles C. Krawczyk

[57] ABSTRACT

Selective ringing for two subscribers who share a single channel in a subscriber carrier telephone system. The ringers at the subscribers' subsets are connected respectively between ground and the ring lead for one subscriber and between ground and the tip lead for the other subscriber. When the central office switching equipment applies a ring signal between its outgoing tip lead and ground, the terminal equipment at the central office transmits both the ring signal and a 1.1 kHz. tip identification signal on the outbound carrier signal. The terminal equipment at the subscriber end of the line detects the identification signal and operates a relay in response to it to cause the output of the "ring" amplifier to be applied between the tip lead and ground. In the absence of the identification signal, the output of the "ring" amplifier is applied between the ring lead and ground.

2 Claims, 1 Drawing Figure

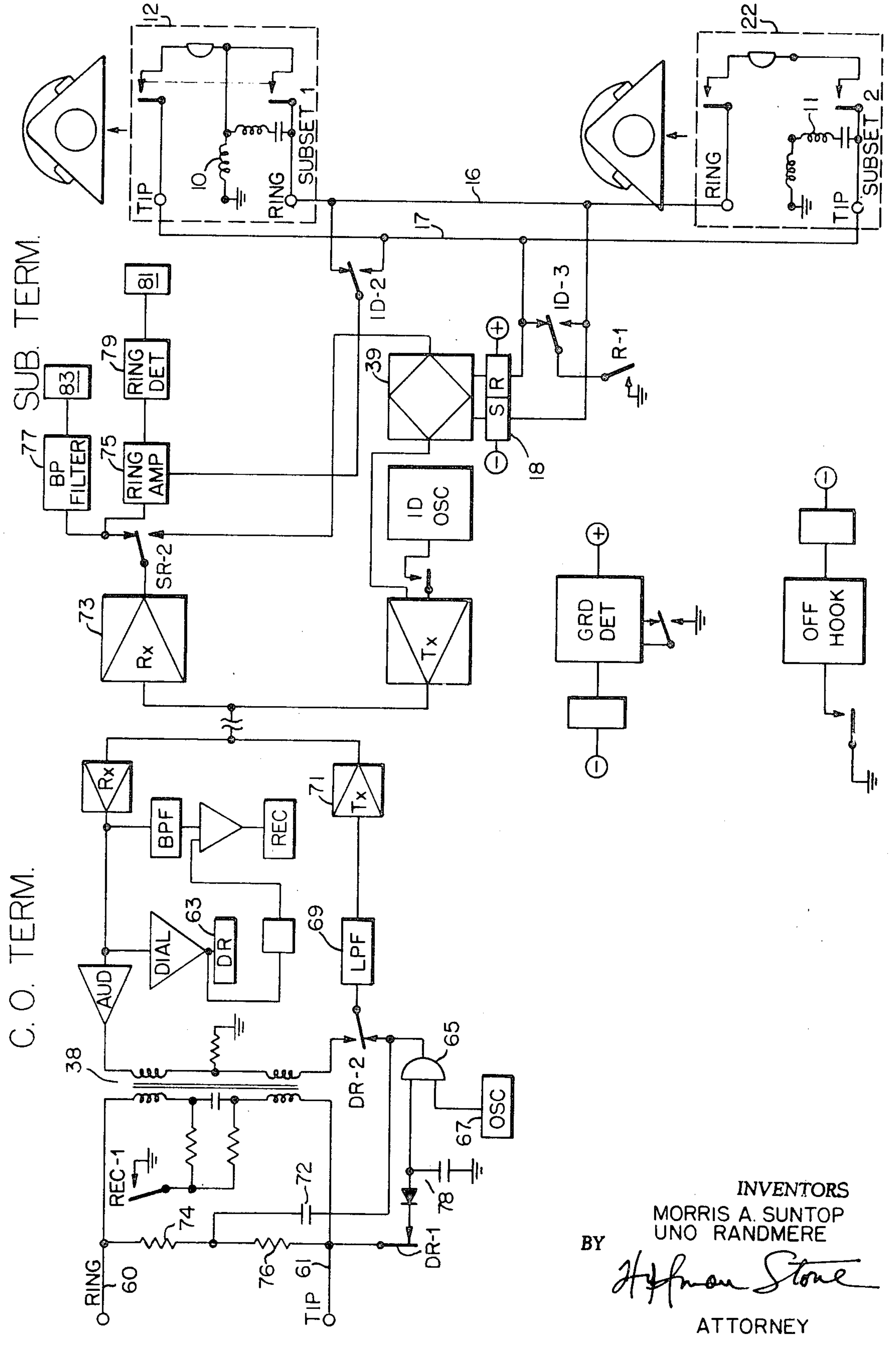
*INVENTORS*
MORRIS A. SUNTOP
UNO RANDMERE
*BY* Hoffman Stone
ATTORNEY

SELECTIVE RINGING IN SUBSCRIBER CARRIER TELEPHONE SYSTEM

BRIEF DESCRIPTION

This invention relates to a novel arrangement for automatic selective ringing (divided ringing) in a subscriber carrier telephone system in which two parties share a single channel.

Subscriber carrier telephone systems are well known. They are used between a central office and subscribers, as contrasted with multiplex systems used between central offices only. They generally provide up to about seven channels. Multiplexing is on a frequency-divided basis. Two carrier signals are used for each channel to provide directional discrimination. In general, the outgoing carrier signals, the ones used to transmit from the central office to the subscribers, are continuously and constantly on the line. The inbound carrier signals, those used to transmit from the respective subscribers to the central office, appear on the line only when the respective subscribers are offhook, and are discontinued when the subscribers are onhook. The subscriber carrier terminal equipment at the central office detects offhook conditions at the subscriber stations by sensing the appearance of the respective inbound carrier signals. Ringing of the subscriber subsets is done by transmitting a ring signal at relatively low energy levels on the carrier signals. The low level ring signal is demodulated at the subscriber terminal and amplified to the level necessary to actuate the ringer in the subset.

Heretofore, several systems have been proposed for selective ringing among different subscribers who share a single channel in systems of this kind. They have usually entailed the transmission of identifying signals of different respective frequencies, one for each of the subscribers on the channel, and filters at the respective subscribers' stations responsive to the respective different frequencies. The previous systems, however, have not been widely accepted and are not in general use; primarily it is thought because of the relatively high cost of the necessary equipment and because of the general trend toward the reduction of multiparty lines.

Many automatic telephone exchanges are arranged to serve two party lines and selectively to ring either one of the parties by applying the ring signals selectively either to the tip or the ring lead of the line, relying on a ground return to complete the circuit.

When the central office serves a subscriber carrier system, however, tip and ring lead selection is not readily available because only a single pair of wires connect the subscriber terminals to the central office terminal. The ring signals must be transmitted as modulation on the respective carriers.

Briefly, the present invention provides a signalling arrangement between the two terminals of the subscriber carrier system to provide for selective ringing of two parties who share a single channel, achieving an effect exactly equivalent, insofar as the central office switching gear and the subscribers' subsets are concerned as selective ringing over the ordinary voice frequency two party line. When the central office equipment applies a ring signal between the ring lead assigned to a particular channel and ground, the terminal equipment simply transmits the ring signal on the selected carrier to the subscriber terminal, where it is demodulated, amplified, and applied to the ring lead that extends from the subscriber terminal to the subsets of the parties who share the channel. Only the subset having its ringer connected between the ring lead and ground rings. When the central office switching equipment applies the ring signal to the tip lead, however, the carrier terminal transmits not only the ring signal but also an identifying signal at a higher frequency, typically about 1 kHz. The carrier terminal equipment at the subscriber end responds to the identifying signal to cause the amplified ring signal to be applied to the ongoing tip lead, and the second subscriber only is rung. A small time delay is inserted in the amplifier arrangement to insure response of the subscriber terminal to the identifying signal before the ring signal is sent out from the subscriber terminal.

DETAILED DESCRIPTION

The presently preferred embodiment of the invention will now be described in detail in connection with the accompanying drawing, wherein the single FIGURE is a block diagram of a subscriber carrier telephone system modified in accordance with the invention to provide for selective ringing.

The circuit of the invention is arranged to respond to so-called tip and ring signalling from the central office switching system. The ring and tip leads 60 and 61, respectively, from the main central office system are connected directly to the primary winding of the hybrid transformer 38 at the central office terminal of the subscriber carrier system. A ring signal applied between ground and either of the ring and tip leads 60 and 61 is applied to the channel transmitter 71 through a low pass filter 69, the normally closed back contact of the contacts DR—2 of the dial pulse relay 63, a capacitor 72, and one of the resistors 74 and 76 that are connected in series between the ring and tip leads.

When the ring signal is applied between ground and the ring lead 60, the carrier is modulated only by the ring signal so long as it persists, and the subscriber terminal applies the ring signal between ground and the ongoing ring lead 16.

When, however, the central office applies the ring signal between ground and the tip lead 61, provision is made to modulate the carrier also with a special party identifying signal, in response to which the subscriber terminal switches its output from the subscribers' ring lead 16 to their tip lead 17. For this purpose an oscillator 67, which may serve all the channels in the carrier system, is continuously operated at the central office. Its output is connected to one input of a gate 65, the output of which is connected to the back contact of the contacts DR–2 of the dial pulse relay. When the gate 65 is enabled, the output of the oscillator 67 is mixed with the ring signal at the input of the low pass filter 69.

The gate 65 is enabled by the output of a rectifier 78, which is connected between the second input of the gate 65 and the tip lead 61 through a pair of normally closed contacts DR–1 of the dial pulse relay. When the ring signal is applied by the central office between ground and the tip lead 61, it produces an output from the rectifier 78 to enable the gate 65 thereby to transmit the output of the oscillator 67 to the low pass filter 69.

The dial pulse relay 63 is energized whenever either one of the subscribers 12 and 22 is offhook, holding its contacts DR–1 open, and thereby inhibiting the gate 65, and advancing the contact DR–2 to the forward position to disconnect the ring signal input from the low pass filter 69.

At the subscriber terminal, the signal from the central office terminal is demodulated and amplified by a receiver 73 and then applied to the inputs of a "ring" amplifier 75 and of a band pass filter 77. If the identifying signal from the oscillator 67 is not present at the output of the receiver 73, no output is produced from the filter 77. The output of the "ring" amplifier 75 is applied to a "ring" detector 79 and to the ring or tip lead 16 or 17 of the subscribers' line, depending on the position of the contacts ID-2 and ID-3 of the identifying relay 83. The "ring" detector 79 operates in response to the output of the "ring" amplifier to energize a "ring" relay 81, closing its contacts R–1 to provide a ground connection for the armature of the double throw contact ID–3 of the identifying relay. In cases when the identifying signal is absent, the tip lead 17 of the line is grounded through the double throw contact ID–3 of the identifying relay 83. In cases when the identifying signal is received, it passes through the band pass filter 77 to pick up the identifying relay 83 advancing its contacts ID–2 and ID–3 to apply the ring signal between the tip lead 17 and ground.

A short delay is provided at the subscriber terminal between the reception of a ring signal and application of the output of the "ring" amplifier to the subscribers' line 16, 17. This may be done, as desired, by delaying the response of the "ring" amplifier 75 or of the "ring" detector 79, or by having the "ring" relay 81 of the delayed pickup type. The delay is long enough to allow the identifying relay 83 to pick up before the ring signal is applied to the line.

When one of the subscribers goes offhook, a ring trip relay (not shown) operates to deenergize the "ring" relay 81 and the identifying relay 83. Also, the signalling relay switches its double throw contacts SR–2 to switch the output of the receiver 73 from the ring amplifier 75 and the filter 77 to the hybrid transformer 39.

The ringers 10 and 11 in the respective subscribers' subsets 12 and 22 are connected in the conventional fashion between ground and the ring lead, for the first subscriber, and the tip lead for the second subscriber. Operation of the system is thereby made to simulate selective ringing of an ordinary two-party line without in any way modifying the switching system in the central office. The only changes required are in the subscriber carrier terminals.

Components shown in the drawing but not referenced or referred to in the description herein relate to an arrangement for automatic number identification of the respective parties as described and claimed in our copending application filed concurrently herewith, Ser. No. 73,559, entitled, "Two Party Automatic Number Identification in Subscriber Carrier Telephone System," and assigned to the same assignee.

What is claimed is:

1. Apparatus for selectively ringing two parties who share a single channel in a subscriber carrier telephone system of the kind which includes a terminal at the central office and subscriber terminals remote from the central office, the central office being connected by a single pair of wires to all of the subscriber terminals and having transmitters and receivers equal in number to the subscriber terminals, there being a separate subscriber terminal for each channel, and in which ring signals are transmitted from the central office terminal to the subscriber terminals as modulation of carrier signals, the central office terminal having a ring and a tip lead, one of each for each channel, connected between the central office terminal and the main office switching system, the arrangement comprising:

a. signal-generating means at the central office terminal for producing an electrical identifying signal at a selected frequency higher than the frequency of the ring signal produced by the main central office system,
b. means at the central office terminal responsive to a ring signal applied by the main central office system between ground and either of the ring and tip leads of a channel for modulating the output of that channel's transmitter by the ring signal,
c. means responsive to the application of a ring signal between the tip lead of a channel and ground for modulating the channel transmitter by the output of said signal generating means,
d. demodulating means at the subscriber terminal of the channel for demodulating the carrier and producing an output signal conforming to a ring signal modulation envelope,
e. detecting means at the subscriber terminal for detecting the presence of an identifying signal in the modulation of the carrier,
f. the subscriber terminal being arranged to apply the output of said demodulating means between ground and the subscribers' ring lead in the absence of an output from said detecting means,
g. switching means at the subscriber terminal for switching the output of said demodulating means from the subscribers' ring lead to their tip lead in response to an output signal from said detecting means, and
h. the ringer in one subscriber's subset being connected between ground and the ring lead of the line, and the ringer of the other subscriber's subset being connected between the tip lead and ground.

2. Apparatus for selectively ringing two parties who share a single channel in a subscriber carrier telephone system of the kind which includes a terminal at the central office and subscriber terminals remote from the central office, the central office being connected by a single pair of wires to all of the subscriber terminals and having transmitters and receivers equal in number to the subscriber terminals, there being a separate subscriber terminal for each channel, and in which ring signals are transmitted from the central office terminal to the subscriber terminals as modulation of carrier signals, the central office terminals having a ring and a tip lead, one of each for each channel, connected between the central office terminal and the main central office switching system, the arrangement comprising:

a. signal generating means at the central office terminal for producing an electrical identifying signal at a selected frequency higher than the frequency of the ring signal produced by the main central office system,
b. means at the central office terminal responsive to a ring signal applied by the main central office system between ground and either of the ring and tip leads of a channel for modulating the output of that channel's transmitter by the ring signal,
c. means responsive to the application of a ring signal between the tip lead of a channel and ground for modulating the channel transmitter by the output of said signal generating means,
d. demodulating means at the subscriber terminal of the channel for demodulating the carrier and producing an output signal conforming to a ring signal modulation envelope,
e. detecting means at the subscriber terminal for detecting the presence of an identifying signal in the modulation of the carrier,
f. the subscriber terminal being arranged to apply the output of said demodulating means between ground and the subscribers' ring lead in the absence of an output from said detecting means,
g. delay means at the subscriber terminal to delay the application of the output of said demodulating means to the subscribers' line for an interval sufficient to insure reliable operation of said detecting means, and
h. switching means at the subscriber terminal for switching the output of said demodulating means from the subscribers' ring lead to their tip lead in response to an output signal from said detecting means,
i. the ringer in one subscriber's subset being connected between ground and the ring lead of the line, and the ringer of the other subscriber's subset being connected between the tip lead and ground.

* * * * *